United States Patent
Cooper

(10) Patent No.: US 6,810,157 B1
(45) Date of Patent: Oct. 26, 2004

(54) DYNAMIC TEMPLATES FOR SPECIFYING VALUES FOR PARAMETERS OF AN OPERATION IN A VIDEO EDITING SYSTEM

(75) Inventor: Brian C. Cooper, Foxborough, MA (US)

(73) Assignee: Avid Technology, Inc., Tewksbury, MA (US)

( * ) Notice: Subject to any disclaimer, the term of this patent is extended or adjusted under 35 U.S.C. 154(b) by 0 days.

(21) Appl. No.: 09/543,215

(22) Filed: Apr. 5, 2000

(51) Int. Cl.[7] .................................................. G06K 9/03
(52) U.S. Cl. ...................... 382/311; 345/581; 345/722; 382/254; 382/302
(58) Field of Search .................................. 382/167, 302, 382/309, 311, 254; 348/651; 345/719, 722, 723, 594, 810, 716, 581

(56) References Cited

U.S. PATENT DOCUMENTS 5,583,665 A * 12/1996 Gregory et al. ............. 358/504
6,151,018 A * 11/2000 Webb et al. ................. 345/722
6,195,101 B1 * 2/2001 Ghislain Bossut et al. . 345/629
6,357,038 B1 * 3/2002 Scouten ....................... 717/122

OTHER PUBLICATIONS

Haynes et al. "Photoshop 5 Artistry", Chapter 12, pp. 89–93, New Riders Publishing, 1998.*
Avid Symphony Color Correction Guide, Release 2.1, 1999, pp. i–7–14.

* cited by examiner

Primary Examiner—Amelia M. Au
Assistant Examiner—Colin LaRose
(74) Attorney, Agent, or Firm—Peter J. Gordon

(57) ABSTRACT

To enable a user to rapidly identify one or more sets of values for parameters of an operation, templates are generated dynamically from sets of values already used for these parameters in content available to the system. Each unique set of values may be extracted from the currently available content. Each of these sets of values may be sorted, for example, by recent modification date, for presentation to a user. The user may then select a set of values from among those displayed for use in the operation.

17 Claims, 3 Drawing Sheets

DYNAMIC TEMPLATES FOR SPECIFYING VALUES FOR PARAMETERS OF AN OPERATION IN A VIDEO EDITING SYSTEM

BACKGROUND

Computer systems generally have a feature through which a user may specify a value for each of one or more parameters used in an operation performed by the computer system. If the values are used always for this operation, they typically are set once as preferences or defaults for the operation. In some applications the values used for the operation change from one use to the next.

An example application is color correction in a video editing system. In such an application, although color correction values might be different from one color correction operation to the next, the same values may be recalled and/or revised occasionally. In some systems, the values are, for example, stored in association with a name or a selection button to enable the values to be recalled. Named settings sometimes are referred to as templates.

SUMMARY

In some applications and for some users, for example in color correction in a video editing system used by a professional colorist, the process of saving and naming templates, and selecting a template from among numerous saved templates, may be an unnatural workflow.

To enable a user to rapidly identify one or more sets of values for parameters of an operation, templates are generated dynamically from sets of values already used for these parameters in content available to the system. Each unique set of values may be extracted from the currently available content. Each of these sets of values may be sorted, for example, by recent modification date, for presentation to a user. The user may then select a set of values from among those displayed for use in the operation. The sets of values extracted in this manner may be characterized as "dynamic templates."

Accordingly, editing of a media component may be facilitated by identifying each unique set of one or more values for one or more parameters for an operation applied to media in one or more available media components. A list of at least some of the identified unique sets of one or more values for one or more parameters is displayed to a user. The user is enabled to select one or more of the identified unique sets of one or more values for one or more parameters for application to media in the media component using the operation.

Identifying each unique set of one or more values for one or more parameters may include sorting the identified unique sets, for example by a timestamp for the set of values. One or more available media components, optionally including the media component being edited and/or media components other than the one being edited, may be identified from which such sets of values may be identified. The list of one or more sets may be modified if the an available media component is altered.

Generation of such a list of sets of values is particularly useful to providing a graphical user interface for color correction operations on video data. A computer system for video editing, and a computer program stored on a computer readable medium, may be provided with such capability.

DETAILED DESCRIPTION

Figure 1:
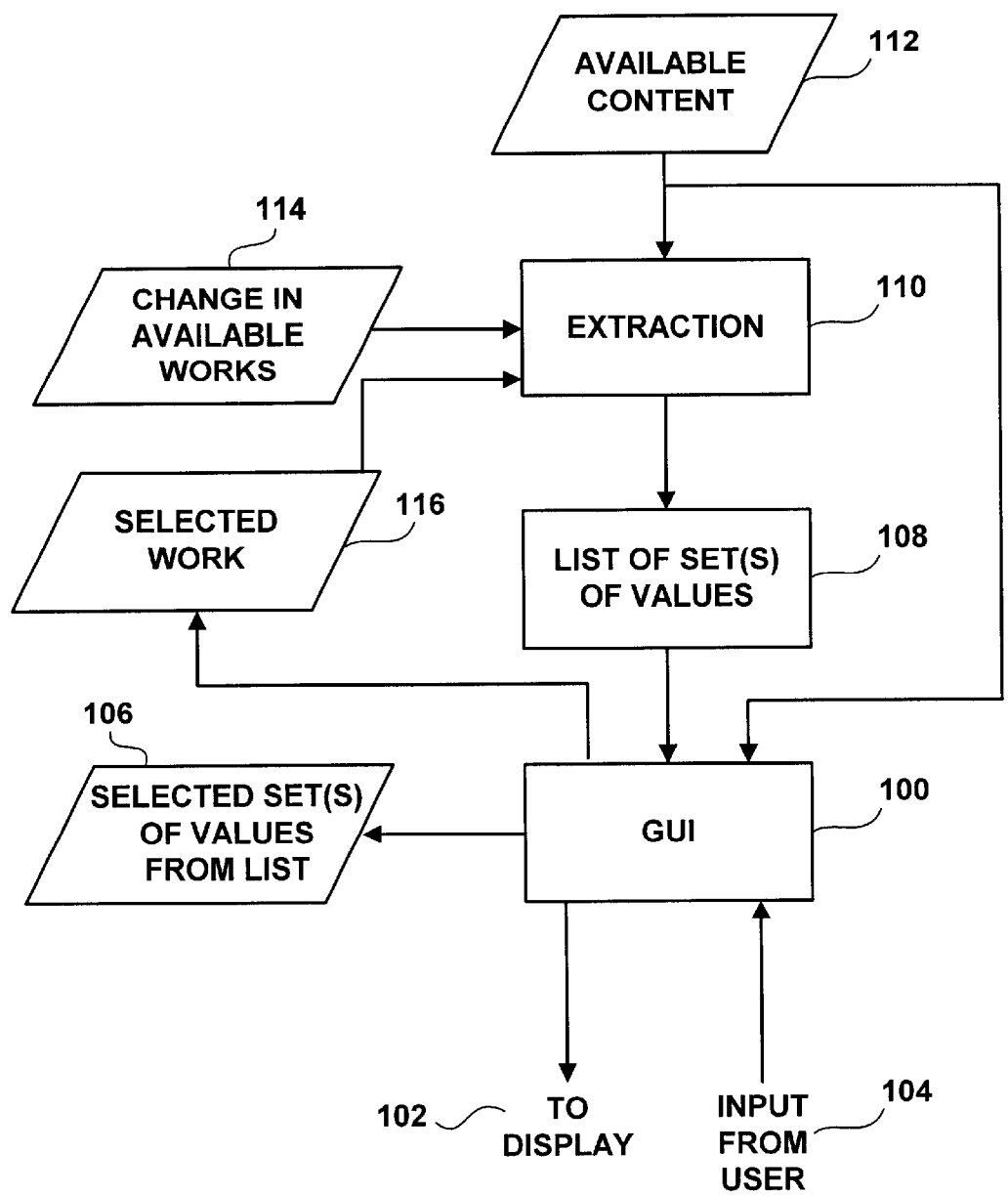
FIG. 1 is a data flow diagram describing how a dynamic template object identifies a list of templates to provide to a user for selection.

Referring now to FIG. 1, a graphical user interface 100 provides display information 102 to a user and receives input 104 from a user to enable the user to select one or more sets 106 of values for parameters for an operation from a list 108 of one or more sets of values. A user also may be presented with available content 112 from which a selected work 116 may be identified.

There are many ways in which the graphical user interface may present the list 108 of one or more sets of values, and the available content, to the user and through which the user may select one or more of these sets or the selected work. For example, the 108 of one or more sets of values list may be sorted or unsorted. Any method known in the art for providing a set of values for parameters for an operation may be used after the selection and the invention is not limited thereto.

The list 108 of one or more sets values for one or more of parameters from which a user may select is provided by extracting, using an extraction process 110 described in more detail below, from available content 112, the values for the parameters of the operation actually used in the available content. A list of available content may be displayed to the user, from which the user may select one or more works, as indicated at 116. The extraction process may be performed in response to an event 114 or an interrupt indicating that a change has been made in the selected work 116, or that a different work has been selected, thus enabling the list of sets of values to change while a work is being authored, or to select other works for review while one work is being authored. Using this graphical user interface, a user avoids saving and naming sets of values as templates.

Figure 2:
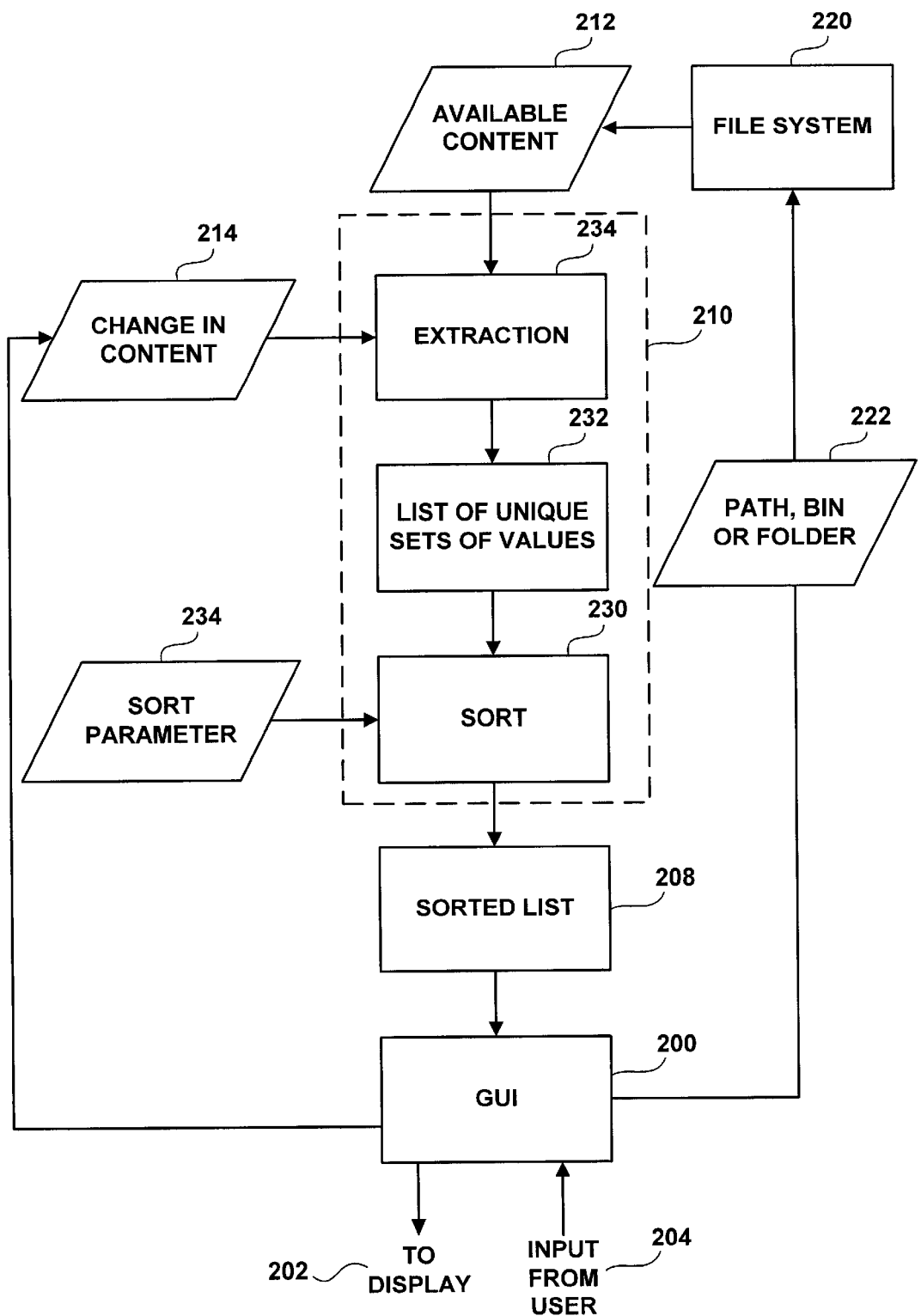
FIG. 2 is a more detailed data flow diagram for the dynamic template object of FIG. 1.

Referring now to FIG. 2, further optional details of the graphical user interface and extraction process shown in FIG. 1 will now be described. An extraction engine 234 receives an indication of the available content 212. This content 212 may be specified through a file system 220 according to a specified path, bin or folders, as indicated at 222. The ability to specify a path, bin or folder also may be provided through the graphical user interface 200.

The extraction process 210 may also involve sorting the extracted sets 232 of values as indicated at 230. The extraction process first generates a list of one or more unique sets of values 232. The sorting engine 230 outputs a sorted list of those values 232 according to a sort parameter 234. The sort parameter indicates a parameter on which the list is to be sorted, such as a time stamp. The list may be limited to a number n of sets so that the most recently used n sets are provided.

Figure 3:
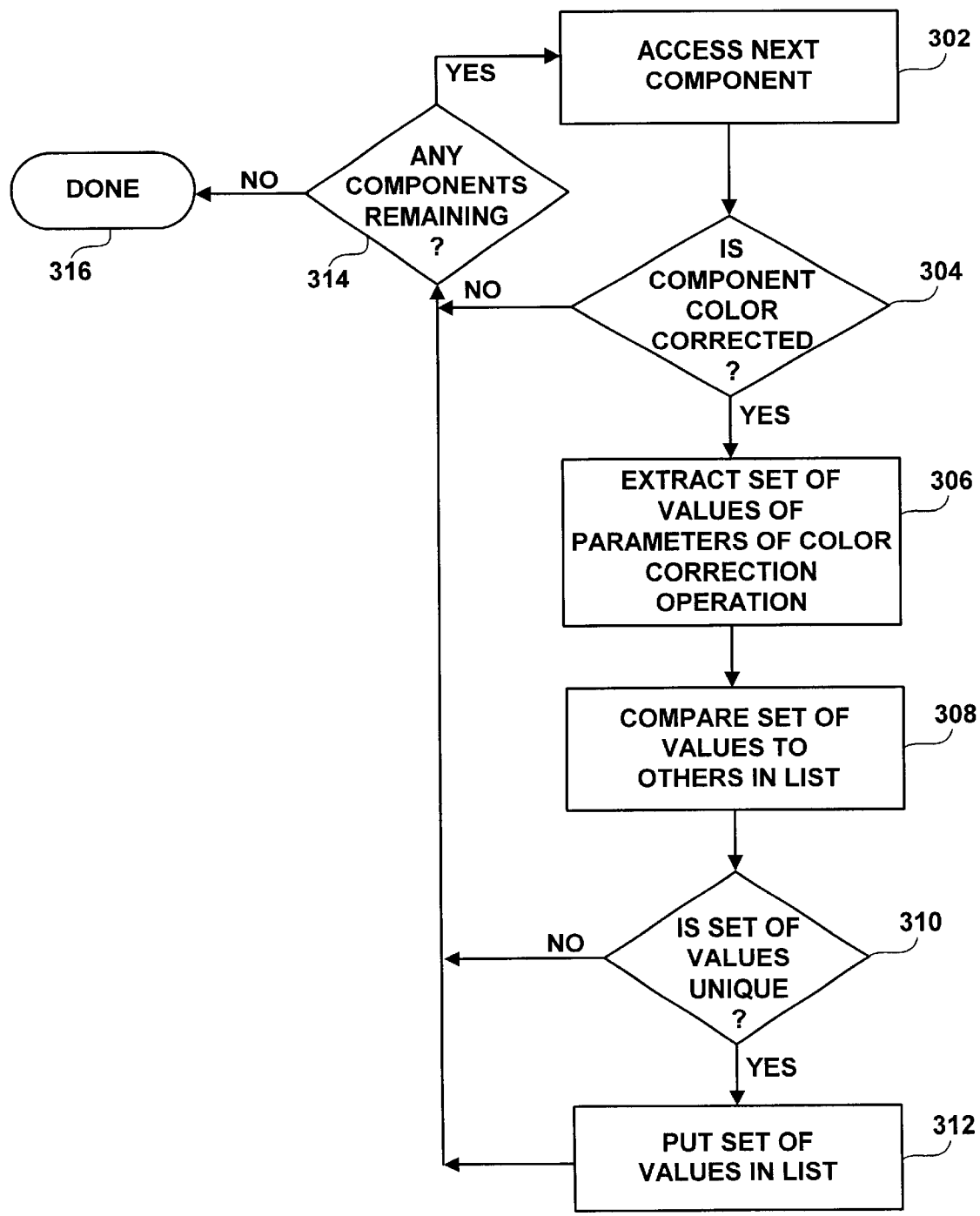
FIG. 3 is a flow chart describing how the extraction in FIG. 1 may be performed.

A process through which lists of sets of values may be extracted from a selected work will now be described in connection with FIG. 3. In this example, the selected operation is a color correction operation, and the kind of work is an audiovisual composition. In this embodiment, the selected work is a specified composition, containing multiple components, wherein each component may have one or more attributes indicating whether color correction operation is performed on the component. An editing system providing such a capability is described in U.S. patent application Ser. No. 09/293,730, hereby incorporated by reference.

The extraction process is invoked if one of the components is altered and if the graphical user interface of FIGS. 1 and 2 is active. Given a composition, this process involves identifying 302 a component in the composition 302. If the component is color corrected, as determined at 304, the set of values for the parameters of the color correction operation is extracted 306. The extracted set of values is compared 308 to other templates already in a list of templates. If the set of values is unique, as determined at 310, it is placed in the list 312. If the component does not have the selected operation applied to it, as determined at 304, or if the extracted set of values is not unique, as determined at 310, or after the set of values is placed in the list 312, it is then determined 314 whether any components remain in this composition. If more components remain, the next component is accessed 302. If no components remain, the process is done 316 and the list of one or more sets of values can be provided to the graphical user interface for display to the user.

Other operations on video data may benefit from such a user interface, such as pan and scan operations and other effects.

Having now described a few embodiments, it should be apparent to those skilled in the art that the foregoing is merely illustrative and not limiting, having been presented by way of example only. Numerous modifications and other embodiments are within the scope of the invention.

What is claimed is:

1. A process for facilitating editing of a media component in an editing system, comprising:

identifying each unique set of one or more values for one or more parameters for an operation that has been applied to media in one or more media components, other than the media component being edited, available to the editing system through a file system;

causing a list of at least some of the identified unique sets of one or more values for one or more parameters to be displayed to a user; and enabling the user to select one or more of the identified unique sets of one or more values for one or more parameters for application to media in the media component being edited using the operation, wherein identifying comprises:

identifying compositions available through the file system; and for each component in each identified composition, extracting from the component the set of values used for the parameters of the operation if the operation has been applied to the component, and determining if the extracted set of values is unique.

2. The process of claim 1, wherein identifying each unique set of one or more values for one or more parameters includes sorting the identified unique sets.

3. The process of claim 2, wherein sorting is performed with respect to date and/or time of modification of each unique set.

4. The process of claim 1, further comprising identifying the one or more available media components.

5. The process of claim 4, wherein the available media components further includes the media component being edited.

6. The process of claim 1, further comprising modifying the list if the one or more values for the one or more parameters for the operation that has been applied to one of the available media components is altered.

7. The process of claim 1, wherein the operation is a color correction operation and the media is video data.

8. A computer program product, comprising:

a computer readable medium; and computer readable instructions stored on the computer readable medium, wherein the instructions, when executed by a computer, instruct the computer to perform a process for facilitating editing of a media component in an editing system, comprising:

identifying each unique set of one or more values for one or more parameters for an operation that has been applied to media in one or more media components, other than the media component being edited, available to the editing system through a file system;

causing a list of at least some of the identified unique sets of one or more values for one or more parameters to be displayed to a user; and enabling the user to select one or more of the identified unique sets of one or more values for one or more parameters for application to media in the media component being edited using the operation, wherein identifying comprises:

identifying compositions available through the file system; and for each component in each identified composition, extracting from the component the set of values used for the parameters of the operation if the operation has been applied to the component, and determining if the extracted set of values is unique.

9. The computer program product of claim 8, wherein identifying each unique set of one or more values for one or more parameters includes sorting the identified unique sets.

10. The computer program product of claim 9, wherein sorting is performed with respect to date and/or time of modification of each unique set.

11. The computer program product of claim 8, wherein the process further comprises identifying the one or more available media components.

12. The computer program product of claim 11, wherein the available media components further includes the media component being edited.

13. The computer program product of claim 8, wherein the process further comprises modifying the list if the one or more values for the one or more parameters for the operation that has been applied to one of the available media components is altered.

14. The computer program product of claim 8, wherein the operation is a color correction operation and the media is video data.

15. A computer program product, comprising:

a computer readable medium; and computer readable instructions stored on the computer readable medium, wherein the instructions, when executed by a computer, instruct the computer to perform a process for facilitating editing of media content in an editing system, comprising:

identifying each unique set of one or more values, for one or more parameters for an operation, already used for the one or more parameters for the operation in media content, other than the media content being edited, available to the editing system through the file system of the computer;

causing a list of at least some of the identified unique sets of one or more values for one or more parameters to be displayed to a user; and enabling the user to select one or more of the identified unique sets of one or more values for one or more parameters for application to the media content being edited using the operation, wherein identifying comprises:

identifying compositions available through the file system; and for each component in each identified composition, extracting from the component the set of values used for the parameters of the operation if the operation has already been used for the component, and determining if the extracted set of values is unique.

16. The computer program product of claim 15, wherein the process further comprises modifying the list if the one or more values for the one or more parameters for the operation that has already been used is altered.

17. The computer program product of claim 15, wherein identifying each unique set of one or more values for one or more parameters includes sorting the identified unique sets according to time of modification of each unique set.

* * * * *